Patented June 24, 1930

1,766,949

UNITED STATES PATENT OFFICE

MORDECAI MENDOZA, OF BLACKLEY, MANCHESTER, ENGLAND, ASSIGNOR TO BRITISH DYESTUFFS CORPORATION LIMITED, OF MANCHESTER, ENGLAND

MANUFACTURE OF NEW INTERMEDIATE COMPOUNDS AND OF AZO DYES THEREFROM

No Drawing. Application filed May 25, 1928, Serial No. 280,649, and in Great Britain May 27, 1927.

In certain copending applications, Ser. Nos. 53,404 (Saunders) and 138,567 (Mendoza and Saunders), certain aminodiarylsulphones are described which are prepared by condensing sulphinic derivatives of o-hydroxy-carboxylic acids with halogenated aromatic nitro compounds containing reactive halogen, with subsequent reduction of the nitro group. In all the compounds described, the sulphinic or sulphone group is in the position para to the hydroxyl group of the o-hydroxy-acid.

It has now been found that similar series of compounds may be prepared in which the sulphinic or sulphone group is ortho to the hydroxyl group, the starting materials being o-hydroxy-carboxylic acids containing a substituent para to the hydroxyl group. The new aminosulphones possess the same valuable characteristics as those described in the copending application, Ser. No. 53,404, that is, they contain in independent parts of the molecule separated by a sulphone bridge, a reactive group ($NA_2$) and a chelate grouping

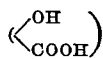

One of the valuable applications of this characteristic arrangement is the preparation of azo dyes which show practically no change in shade when chromed. By the present invention the variety of substances containing this useful characteristic configuration is greatly extended and a large number of new products of this type are made available for use in dyestuff and other manufactures.

For the preparation of the new series of intermediates and azo dyes I may start from any orthohydroxycarboxylic acid substituted in the position para to the hydroxyl group but unsubstituted in the position ortho to the hydroxyl group. Examples of suitable starting materials are p-cresotinic acid (I), 5-chlorosalicylic acid (II)

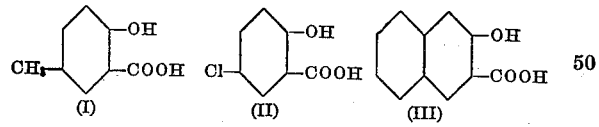

and 2:3-hydroxynaphthoic acid (III), but I do not limit my invention to these specific illustrations. The hydroxy-acid is first converted into a chlorosulphonyl derivative, by treatment with chlorosulphonic acid, and the product is reduced to the 3-sulphinic acid in the usual manner. For the conversion of these sulphinic acids into sulphones, two methods are available. By the first method the sulphinic acid is condensed with a halogenated nitro compound containing reactive halogen, suitable compounds being 1-chloro-2-nitrobenzene, 1-chloro-4-nitrobenzene, 1-chloro-2-nitrobenzene-4-sulphonic acid; 1-chloro-4-nitrobenzene-2-sulphonic acid, 1-chloro-2:4-dinitrobenzene, 1-chloro-2:4-dinitronaphthalene, 4-chloro-3-nitrobenzaldehyde, 4-chloro-3-nitrobenzoic acid, 2-chloro-5-nitrobenzoic acid, 4-chloro-3-nitrobenzonitrile, 2-chloro-5-nitrobenzonitrile, 4-chlorobenzonitrile, 2-chloro-benzonitrile, and corresponding compounds containing other halogens in place of chlorine. My invention is not limited to these specific halogenated nitro compounds, which are merely illustrative.

The nitro or dinitro sulphones so obtained are reduced to amino- or diamino-sulphones in the usual manner, and these products may be used for the production of azo dyes. The monoamines or the monoacylated diamines may be diazotized and coupled with the usual coupling components. The diamines may be coupled in acid solution with diazo compounds, or may be treated with nitrous acid to give dyes of the Bismarck Brown type.

By the second method the o-hydroxy-sulphinic acid is condensed with a p-quinone mono- or di-imine, giving para amino-hydroxy- or para diamino-diaryl sulphones; e. g.

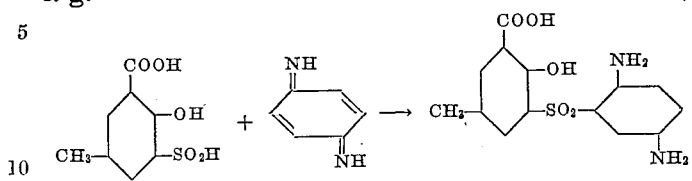

This method has already been used for the production of sulphones from p-hydroxysulphinic acids, but it was not hitherto known that it could be applied to o-hydroxysulphinic acids; indeed the successful result is surprising in view of the known reluctance of ortho substituted acids to enter into reactions, owing to "steric hindrance."

The process of producing the azo dyestuffs of my invention can be briefly described as diazotizing a compound of the type

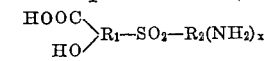

or

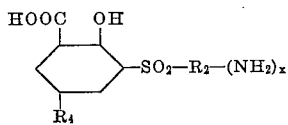

wherein $x$ represents 1 or 2, $R_1$ and $R_2$ represent benzene or naphthalene residues which may be further substituted and in which the —$SO_2$— and the —COOH groups are ortho to the —OH group and $R_4$ represents a substituent such as —$CH_3$ or —Cl; and coupling with an azo dye coupling component. The intermediates of my invention can also be used as end components, being coupled with diazo compounds, by which term I intend to include diazotized amino compounds, diazotized amino azo compounds and tetrazotized diamino compounds.

The dyestuffs and intermediates of my invention can be represented by the following probable formula

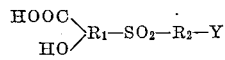

wherein $R_1$ and $R_2$ represent benzene or naphthalene residues which may be further substituted, Y represents a substituent selected from a group consisting of —$NH_2$, —N:N—$R_8$ and —N:N—$R_8$—N:N—$R_9$ wherein $R_8$ and $R_9$ are residues of azo dye components and in which the —$SO_2$— and the —COOH groups are ortho to the —OH group.

One of the more important classes of dyes and intermediates which are included in the scope of the above formula can be represented by the formula

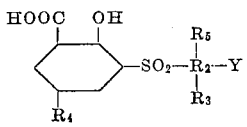

wherein $R_3$, $R_4$ and Y have their former significance, $R_3$ represents hydrogen or a substitution group such as —$SO_3H$, —CHO, —CN, —COOH, —$NO_2$, —$NH_2$ or an acetylated amino group, and $R_5$ represents —H or —$NH_2$.

Other generic formulæ which may be used to represent the intermediates and dyes are:

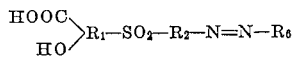

and

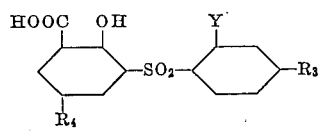

wherein $R_6$ represents a coupled azo dye component and the other symbols have their previous significance.

I describe in the examples the production of several typical intermediates and azo dyes therefrom, these examples being illustrative and not limitative. The parts are by weight.

*Example 1.*—25.05 parts of 3-chlorosulphonyl-5-methyl-salicylic acid (from p-cresotinic acid) in intimate mixture with 13 parts of zinc dust, are slowly charged with stirring into 120 parts of methylated spirit cooled by an external bath. Charging is carried on at such a rate that the temperature does not rise appreciably and stirring is continued for some hours after all the mixture has been added. The reacting mass thickens gradually until eventually a thick paste of the zinc salt of the sulphinic acid is obtained. This is then filtered and converted into the soluble sodium salt by treatment with hot aqueous soda and filtering from the precipitated zinc carbonate. The free sulphinic acid is obtained as a white crystalline body on acidification of the solution of the sodium salt. It is moderately soluble in cold water, easily soluble in hot water, alcohol and ether. It melts at 170° C. It undergoes decomposition when the acidulated aqueous solution is heated. In a similar manner to the above the corresponding sulphinic acids from 5-chlorosalicylic and β-hydroxy naphthoic acids are obtainable when the equivalent amounts of the chlorosulphonyl compounds are reduced.

5-chloro-3-sulphinosalicylic acid melts at 200°–201° C. and exhibits the same general properties as the product from p-cresotinic acid.

2-hydroxy-1-sulphino-3-naphthoic acid decomposes without melting when heated, and exhibits solubility properties similar to those of the other acids of this series. Each of the above sulphinic acids reacts with nitrous acid with formation of a white sparingly soluble crystalline compound which is probably the corresponding sulfhydroxamic acid (cf. Beilstein, II, 109).

*Example 2.*—21.6 parts of 3-sulphino-5-methylsalicylic acid and 23.75 parts of 4-chloro-3-nitrobenzene sulphonic acid are made into a neutral aqueous solution in 100 parts of water with the aid of 15.9 parts of anhydrous sodium carbonate. The mixture is boiled under a reflux condenser for some hours, in the course of which the colour assumes a greener tinge. The nitrosulphone, which is produced in very good yield, may be isolated by strongly acidifying with mineral acid, when it is precipitated as an almost white crystalline solid. It is readily soluble in water with slight warming, giving a colourless solution. In alkalies it dissolves readily with formation of a yellow solution. For the present purpose it is not necessary to isolate the nitrosulphone as the solution of the sodium salt, as obtained above, can be readily reduced by any convenient method of reduction, e. g. iron filings and acid, stannous chloride, etc.

The amino sulphone obtained on reduction can be readily isolated from the reduction mixture by treatment with strong mineral acid after elimination of the metal used in the reduction process.

It forms a nearly white crystalline compound fairly soluble in water and easily so in alkalies. On treatment with nitrous acid in the customary manner it yields a sparingly soluble crystalline yellow diazo compound which is capable of ready coupling with any of the usual coupling components with the production of new azo dyestuffs.

By using the equivalent quantity (23.65 parts) of 5-chloro-3-sulphinosalicylic acid in place of the sulphino cresotinic acid used above, and working in a similar manner, the corresponding nitro and aminosulphones may be obtained. These are similar in characteristics to the p-cresotinic compounds.

Further, if 25.2 parts of 2-hydroxy-1-sulphino-3-naphthoic acid are substituted for the 21.6 parts of sulphino-p-cresotinic acid, the corresponding beta-hydroxynaphthoic nitro and amino sulphones are obtained. This amino sulphone is soluble in hot water and the aqueous solution gelatinizes on cooling.

By substituting 2-chloro-5-nitrobenzenesulphonic acid for the 4-chloro-3-nitrobenzenesulphonic acid used above, isomeric nitro and amino sulphones can be prepared. These are similar in character to those already described.

*Example 3.*—21.6 parts of 3-sulphino-5-methylsalicylic acid are added to a boiling alcoholic solution of 20.25 parts of 2:4-dinitrochlorobenzene and 8.2 parts of fused sodium acetate. The mixture is gently boiled under reflux for some hours, in the course of which a thick deposit of nearly white dinitrosulphone is formed. This is cooled and filtered. It may be purified by dissolving in alkali and reprecipitating with acid. The dinitrosulphone melts at 284° C.–286° C. with decomposition. It is insoluble in water, sparingly soluble in alcohol, and easily soluble in alkalies with formation of a greenish-yellow solution.

This condensation can also be effected by working in aqueous medium and in a similar manner using the equivalent amount (28.25 parts) of 2:6-dinitrochlorobenzene-4-sulphonic acid, a sulphonated dinitrosulphone can be produced.

By substituting in the above preparation the requisite quantities of the sulphinic acids derived from 5-chloro-salicylic or 2:3-hydroxynaphthoic acid for sulphino-p-cresotinic acid, other dinitrosulphones are obtained. The dinitrosulphone from 2-hydroxy-1-sulphino-3-naphthoic acid is yellow in colour, insoluble in water, sparingly so in alcohol and easily so in alkali with production of a deep yellow solution. It melts with decomposition at 260° C. The corresponding 5-chlorosalicylic dinitrosulphone is white and melts at 266° C.–268° C. It is insoluble in water, soluble in hot alcohol and in alkali. All of the above-mentioned dinitrosulphones yield the corresponding diamines on reduction. I find stannous chloride very convenient for this purpose.

The diaminosulphones prepared from 2:4-dinitrochlorobenzene on treatment with nitrous acid yield deep brownish-red dyestuffs probably of the Bismarck Brown type. They couple readily with diazo compounds and in this manner new azo dyestuffs are formed.

The diaminosulphones readily yield monoacetyl derivatives which are diazotizable and form useful diazo components for new azo dyes. On the other hand the diamino sulphones prepared from 2:6-dinitrochlorobenzene-4-sulphonic acid tetrazotizes normally on treatment with nitrous acid. They thus form a new series of first components in the preparation of azo dyestuffs.

*Example 4.*—10.8 parts of p-phenylenediamine are dissolved in 100 parts of water and sufficient 10 per cent hydrochloric acid so that the resulting solution has a faintly acid reaction to Congo paper.

This is cooled by an external bath and into it is slowly run—with stirring—a solution of 30 parts of hydrated ferric chloride in 150 parts of water. During this addition the temperature is not allowed to exceed 0° C. When all the ferric chloride solution has been added, stirring is continued, and after a short time a neutral solution of 25.2 parts of 1-sulphino-2-hydroxy - naphthalene - 3 - carboxylic acid in 250 parts of water is added in the cold.

A dark grey precipitate is obtained which after some hours further stirring is filtered off. This is dissolved at boiling temperatures in 400 parts of water together with sufficient strong caustic soda (30 per cent) to impart a caustic alkaline reaction to test paper.

The precipitated iron oxide is filtered hot and the clear filtrate is made definitely acid by the addition of strong hydrochloric acid. A copious light coloured precipitate is thrown down from which the p-diaminosulphone is obtained in pure condition by extraction at boiling temperatures. On cooling the acid extract, the diamine is deposited in flocculent form. When dried and ground it forms a light grey powder sparingly soluble in boiling water, moderately soluble in hot acids and easily soluble in alkalies.

The condensation can be similarly performed when homologues of p-phenylenediamine are used in place of the p-phenylenediamine (e. g. p-toluylene diamine) and also when its mono and dialkyl derivatives are used.

Similarly the sulphino derivatives of p-cresotinic and 5-chlorosalicylic acids may replace the 1-sulphino-2-hydroxynaphthalene-3-carboxylic acid.

*Example 5.*—A solution of 35 parts of hydrated ferric chloride (FeCl$_3$6H$_2$O) in 150 parts of water is slowly stirred into a solution of 14.6 parts of p-aminophenol hydrochloride in 150 parts of water at a temperature not exceeding 0° C. To the deep violet solution so obtained is then added, in the cold, a neutral solution of 25.2 parts of 1-sulphino-2-hydroxynaphthalene-3-carboxylic acid in 250 parts of water.

A dark sandy coloured precipitate containing iron is obtained which after some hours is filtered. After elimination of the iron as in Example 4, the clear alkaline filtrate is acidified with strong hydrochloric acid and the precipitated p-oxyaminosulphone is extracted at boiling temperatures. It is deposited as a reddish-brown crystalline powder on cooling.

It is practically insoluble in water, easily soluble in alkalies and fairly soluble in hot acid, it is readily diazotizable and the diazo compound couples easily with the usual coupling components to form new azo dyestuffs.

As in Example 4, this condensation may be performed with equal readiness when the o-sulphinic acids derived from p-cresotinic and 5-chlorosalicylic acids are used in place of the 1-sulphino-2-hydroxynaphthalene-3-carboxylic acid.

*Example 6.*—38.7 parts of the aminosulphone prepared as in Example 2 from sulphino-p-cresotinic acid and 4-chloro-3-nitrobenzenesulphonic acid are dissolved in 250 parts of water with the addition of 10.6 parts of anhydrous sodium carbonate. To the neutral solution so obtained 6.9 parts of sodium nitrite are added and the mixture is run, while stirring, into 42 parts of hydrochloric acid (26 per cent) cooled externally. The sparingly soluble diazo compound separates in yellow crystalline form and when the reaction is complete, the diazo suspension is allowed to flow into a solution of 14.4 parts of beta-naphthol containing 25 parts of anhydrous sodium carbonate. Coupling is very rapid and when complete the dyestuff is salted out, filtered and dried. It forms an orange coloured powder.

The dyestuff has the probable formula:

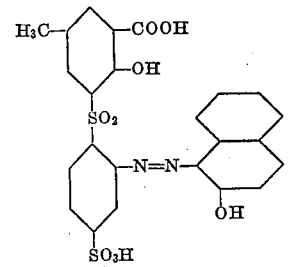

Printed on cotton with chrome mordant the dyestuff yields bright orange shades fast to hot soap and chlorine. Instead of beta-naphthol, 1-(p-sulphophenyl)-3-methyl-5-pyrazolone (for yellow), beta-hydroxynaphthoic anilide (for salmon pink), beta-naphthol-3:6-disulphonic acid (for golden orange), alpha-napthol-5-sulphonic acid (for blue-red), ethyl-alpha-naphthylamine (for bright bluish-red) and 2-amino-8-naphthol-6-sulphonic acid (coupling in acid medium for bright bluish-red) may be used.

In addition to being useful printing colours, all the above may be used as acid chrome colours for wool. They yield shades of good fastness to light, soaping and chlorine. On after-chroming the shade is altered only slightly but the fastness properties are greatly enhanced.

Dyestuffs closely resembling the above in shade and fastness properties are also obtained when the amino sulphones derived from the sulphino derivatives of 5-chlorsalicylic acid with 4-chloro-3-nitrobenzenesulphonic acid are used in amounts equivalent to the aminosulphone from p-cresotinic acid above mentioned.

The same is true also of the isomeric aminosulphones derived from 2-chloro-5-nitrobenzenesulphonic acid.

*Example 7.*—38.7 parts of the amino sulphone prepared as in Example 2, from sulphino-p-cresotinic acid and 4-chloro-3-nitrobenzenesulphonic acid are dissolved in 250 parts of water by means of 10.6 parts of anhydrous sodium carbonate. To the neutral solution so obtained 6.9 parts of sodium nitrite are added and the mixture is run while stirring into 42 parts of hydrochloric acid (26 per cent) cooled externally. The sparingly soluble diazo compound separates in yellow crystalline forms and when the reaction is complete the diazo suspension is allowed to flow into a solution of 32.3 parts of 1-(2 : 5-dichloro-4-sulphophenyl)-3-methyl-5-pyrazolone in 250 parts of water containing 25 parts of anhydrous sodium carbonate.

Coupling is very rapid and when complete the dyestuff is isolated by salting out after giving the solution a slight mineral acidity with hydrochloric acid.

When dry it forms a light brown powder which dissolves in water to a yellow colored solution becoming orange on addition of alkalies and which dissolves in strong sulphuric acid to a yellow solution, which remains yellow on dilution. Printed on cotton in presence of chrome mordant, bright greenish-yellow shades are obtained of good fastness to soaping and fairly good fastness to chlorine.

When dyed on wool from an acid bath similar shades are obtained. The shade becomes somewhat greener on after-chroming.

*Example 8.*—42.3 parts of the amino sulphone prepared from sulphino β-hydroxynaphthoic acid and 4-chloro-3-nitrobenzene-sulphonic acid are dissolved in 250 parts of water with the addition of 10.6 parts of anhydrous sodium carbonate.

To the neutral solution so obtained 6.9 parts of sodium nitrite are added and the mixture is run while stirring, into 42 parts of hydrochloric acid (26 per cent) cooled externally. The sparingly soluble diazo compound separates as a reddish-yellow paste and when the reaction is complete the diazo suspension is allowed to flow into a solution of 14.4 parts of beta-naphthol in 250 parts of water containing 25 parts of anhydrous sodium carbonate. Coupling is very rapid and, when complete, the dyestuff is salted out, filtered and dried. It forms an orange colored powder which dissolves in water to an orange solution which is turned redder on addition of alkalies and gives an orange precipitate on addition of hydrochloric acid. The powder dissolves in strong sulphuric acid to a crimson colored solution which yields an orange-brown precipitate on dilution.

Printed on cotton with chrome mordant the dyestuff yields bright orange shades fast to hot soap and chlorine.

Dyed on wool from an acid bath orange shades are obtained which become slightly flatter on after-chroming.

By using 1-(p-sulphophenyl)-3-methyl-5-pyrazolone in place of β-naphthol in the above example, a dyestuff which gives yellow prints on cotton is obtained, and by using 1-(2 : 5-dichloro-4-sulphophenyl)-3-methyl-5-pyrazolone a more greenish-yellow shade is obtained.

*Example 9.*—42.3 parts of the amino sulphone prepared from sulphino β-hydroxynaphthoic acid and 4-chloro-3-nitrobenzene-sulphonic acid are dissolved in 250 parts of water by means of 10.6 parts of anhydrous sodium carbonate.

To the neutral solution so obtained 6.9 parts of sodium nitrite are added and the mixture is run while stirring into 42 parts of 26 per cent hydrochloric acid, cooled externally. The sparingly soluble diazo compound separates as a reddish-yellow paste and when diazotization is complete a neutral solution of 23.9 parts of 2-amino-8-naphthol-6-sulphonic acid in 250 parts of water is allowed to run in slowly.

Coupling takes place very readily with formation of a bright bluish-red dyestuff which on completion of the reaction is isolated by means of salt in the usual manner.

When dry it forms a very dark red-brown colored powder which dissolves in water to a crimson solution which is turned bluer on addition of caustic soda and gives a red-violet precipitate on addition of hydrochloric acid. The powder dissolves in strong sulphuric acid to an orange-brown solution which yields a red-violet precipitate on dilution and the dyestuff prints cotton with chrome mordant a bright bluish-red shade fast to hot soaping and chlorine.

When dyed on wool from an acid bath bright blue-red shades are obtained which on after-chroming are unaffected in tone.

*Example 10.*—To the acid suspension of the diazo compound described in the first paragraph of Example 6, there is added a neutral solution of 23.9 parts of 2-amino-8-naphthol-6-sulphonic acid. This coupling, in acid medium, rapidly reaches completion and it is then made neutral to test paper by the careful addition of soda. Twenty-five parts of sodium bicarbonate are added and the mixture is cooled by an external cooling bath. The diazo compound from 13.8 parts of p-nitroaniline is then slowly stirred in. When coupling is complete the dyestuff is salted out, filtered and dried. It forms a dark brown powder. Printed on cotton it yields deep brown shades of good fastness to soap and chlorine. A similar shade is produced when wool is dyed by it from an acid bath. After-chroming changes the shade to an inappreciable extent while increasing the fastness properties. Dyestuffs of very similar characteristics are obtained when the other aminosulphones mentioned in Example 6 are used as the first components.

*Example 11.*—To the acid suspension of the diazo compound described in the first paragraph of Example 6 is added a solution of 17.4 parts of m-amino-p-cresol methyl ether hydrochloride. When the coupling has been completed by removal of the mineral acidity by means of sodium acetate, the solution is reacidified with hydrochloric acid and 6.9 parts of sodium nitrite are added for rediazotization. When this has been absorbed, the new diazo compound is coupled with 31.5 parts of phenyl-J-acid in a medium having a carbonate alkalinity. When coupling is complete the new dyestuff is salted out at the ordinary temperature, filtered and dried. It forms a dark violet colored powder. Printed on cotton with chrome mordant it yields violet shades of very good fastness to soap and chlorine. The dyestuffs dye wool a violet shade. If in place of the phenyl-J-acid as end component, other components are used, varying shades are produced. Thus beta-naphthol yields a blue-violet, salicylic acid a warm red-brown, chromotrope acid a greenish-blue. All of these may be used as either chrome printing colours for cotton or as acid chrome colours for wool.

*Example 12.*—18.4 parts of benzidine are tetrazotized and combined with 13.8 parts of salicylic acid in the usual manner. Side by side with this preparation, 40.75 parts of aminosulphone obtained by condensing 5-chloro-3-sulphino-salicylic acid with 4-chloro-3-nitrobenzenesulphonic acid, as in Example 2, are diazotized as in Example 6. Into the diazo suspension so prepared a neutral solution of 34.1 parts of H-acid (acid sodium salt) is slowly stirred. When coupling is complete, it is made alkaline and the benzidine-salicylic diazo-azo compound is added. The final coupling is allowed to proceed for 12 hours in the cold. When complete, the dyestuff is isolated by salting out after acidifying with hydrochloric acid. It prints cotton in green shades fast to warm soap and chlorine. It dyes wool a green shade, the fastness properties of which are increased by after-chroming without any appreciable alteration in shade.

*Example 13.*—40.2 parts of the sulphonated diaminosulphone, obtained as in Example 3, by condensing the sulphino derivative of p-cresotinic acid with 2:6-dinitrochlorobenzene-4-sulphonic acid, are dissolved in 300 parts of water with the addition of 10.6 parts of anhydrous sodium carbonate. The neutral solution so obtained is mixed with 13.8 parts of sodium nitrite and the mixture run, while stirring, into 84 parts of 26 per cent hydrochloric acid with external cooling. When tetrazotization is complete the tetrazo compound is slowly added to a cooled alkaline solution of beta-naphthol containing 50 parts of anhydrous sodium carbonate. The dyestuff is isolated in the usual manner when coupling is complete. It is a dark powder. In the presence of chrome mordant it prints cotton in grey shades fast to soap and chlorine.

Dyed on wool from an acid bath it gives blue-black shades which are unaltered on after-chroming. The shades are of good fastness to light, soap and chlorine.

If acetyl-H-acid is used in place of the beta-naphthol, greyish-violet shades are produced on cotton and wool.

Similar dyestuffs are also produced when the corresponding sulphonated diaminosulphones obtained from 5-chloro-salicylic and beta-hydroxynaphthoic-sulphinic acids are used as the tetrazo components.

*Example 14.*—The diazo compound obtained from 22.3 parts of naphthionic acid is slowly stirred into a well-cooled solution of 32.2 parts of the diaminosulphone (obtained as in Example 3 from the condensation product of sulphino-p-cresotinic acid with 2:4-dinitrochlorobenzene) containing sufficient sodium carbonate to ensure coupling in alkaline medium. On completion of the combination the dyestuff is salted out at the ordinary temperature. When dry it is a dark brown powder.

In the presence of chrome mordant it prints cotton in brown-orange shades fast to hot soaping and chlorine, while wool is dyed in brown-orange shades from an acid bath, which are turned slightly browner on after-chroming. Very similar shades are produced when the corresponding diaminosulphones obtained from 5-chlorosalicylic and beta-hydroxy-naphthoic-sulphinic acids are used as end components.

Using the diazo compound from p-nitroaniline-o-sulphonic acid in place of the naphthionic acid derivative, slightly yellower shades on cotton and wool are obtained.

*Example 15.*—34.4 parts of benzidine-2:2'-disulphonic acid are tetrazotized in the customary manner and are then stirred into a cooled alkaline solution of 71.6 parts of the diaminosulphone obtained as in Example 3 by reducing the condensation product of beta-hydroxynaphthoic sulphinic acid and 2:4-dinitrochlorobenzene. On isolating by salting out at the neutral point a violet colored powder is obtained. In the presence of chrome mordant this prints cotton a red-brown shade fast to hot soaping.

As in the other examples, the corresponding diaminosulphones from p-cresotinic and 5-chlorosalicylic-sulphinic acids give very similar effects to the above. All these dyestuffs can be used as acid chrome colours for wool.

*Example 16.*—The aminoazo dyestuff prepared according to known procedure, by coupling 9.3 parts of aniline with 22.3 parts of 1:7-naphthylaminesulphonic acid, is rediazotized and stirred into an alkaline solution of 35.8 parts of the diaminosulphone derived from beta-hydroxynaphthoic acid as described in Example 15.

When coupling is finished the dyestuff is isolated as usual. It is a dark grey powder. It prints cotton, with the aid of chrome mordant, in warm brown shades of good fastness to soap and chlorine. Like results are obtained when the other diaminosulphones of Example 15 are used as end components. As in the other cases these dyestuffs may be used also as acid chrome colours for wool.

*Example 17.*—To a dilute hydrochloric acid solution of 32.2 parts of the diaminosulphones derived as in Example 3 from sulphino-p-cresotinic acid and 2:4-dinitrochlorobenzene are added 12 parts of acetic anhydride followed by sufficient sodium acetate to remove the mineral acidity. The mixture is stirred for about 12 hours, by which time formation of the mono acetyl compound is complete. Soda is added until a neutral reaction to test paper is shown. To the clear solution so obtained 6.9 parts of sodium nitrite are added and the mixture is diazotized as in Example 6. The resulting diazo compound is yellow in colour and sparingly soluble. It is readily coupled with the usual coupling components and forms dyestuffs which may be used as acid chrome colours for wool or as printing colours for cotton.

Thus, when coupled with one equivalent of 1-(2:5-dichloro-4-sulphophenyl)-3-methyl-5-pyrazolone, a light brown dyestuff is obtained which prints cotton in the presence of chrome mordant, in reddish-yellow shades fast to soaping.

Using—in acid medium—2:8-aminonaphthol-6-sulphonic acid as coupling component, a dark violet dyestuff is obtained which prints cotton in blue-red shades, while the use of 1-naphthol-5-sulphonic acid gives rise to a violet dyestuff by means of which cotton can be printed in reddish-brown shades.

Analogous acetyl compounds derived in similar manner to the above from the other diaminosulphones described in Example 3 are found to give rise to dyestuffs similar to the above.

*Example 18.*—35.8 parts of the diamino sulphone obtained as in Example 4 by condensing the quinone di-imine from p-phenylene-diamine with 1-sulphino-2-hydroxy-naphthalene-3-carboxylic acid are made into neutral solution with soda ash in 300 parts of water. The mono acetyl derivative is obtained by stirring for some hours with 11 parts of acetic anhydride after adding 14 parts of sodium acetate. The product is made neutral to litmus by the addition of soda ash and 6.9 parts of sodium nitrite are then added. The whole is then stirred at 5–10° C. into 12.5 parts of hydrochloric acid in 100 parts of water.

Diazotization results in the formation of a sparingly soluble reddish-yellow body and is complete in the course of one hour.

Into this stirring diazo suspension is slowly run a neutral solution of 23.9 parts of 2:8-aminonaphthol-6-sulphonic acid in 300 parts of water. A bluish-red dyestuff is formed which, when coupling is complete, is salted out in the usual manner. When dry it is a dark red powder. Printed on cotton in presence of chrome mordant it yields blue-red shades of good fastness to soaping and chlorine. A similar shade is produced on wool from an acid bath. Very little change occurs on after-chroming.

If in place of 2:8-amino-naphthol-6-sulphonic acid, R salt is used as the coupling component, the resulting dyestuff yields red shades on cotton and wool while 1-[2:5-dichloro-4-sulphophenyl]-3-methyl-5-pyrazolone used as end component results in the formation of a greenish-yellow dye, and m-phenylenediamine as component gives a reddish-brown. The coupling with these latter end components is carried out in alkaline medium.

*Example 19.*—35.9 parts of the p-amino-hydroxy-sulphone produced as in Example 5 from 1-sulphino-2-hydroxy-naphthalene-3-carboxylic acid and p-aminophenol hydrochloride are made into a neutral solution with the addition of soda ash in about 250 parts of water. To the clear solution is added 6.9 parts of sodium nitrite and the mixture is run with stirring into 12.5 parts of hydrochloric acid in 100 parts of water at 5–10° C.

When diazotization is complete the diazo body is added to 32.3 parts of 1-[2:5-dichloro-4-sulphophenyl]-3-methyl-5-pyrazolone dissolved in 250 parts of water with 25 parts of anhydrous sodium carbonate.

Coupling is very rapid and when complete the new dyestuff is isolated by salting out after making slightly acid.

It is a light brown powder which prints cotton in the presence of chrome mordant in yellow shades of good fastness to soaping. Similar shades are produced on wool from an acid bath—the colour becoming slightly greener on after-chroming.

Other dyestuffs of similar fastness properties also capable of use as acid and chrome colours for wool and as chrome printing colours are obtained when different coupling components are used. Thus, using 2:8-aminonaphthol-6-sulphonic acid in place of the 1-[2:5-dichloro-4-sulphophenyl]-3-methyl-5-pyrazolone, a red dyestuff is obtained, while the use of R salt produces a reddish-orange dye.

*Example 20.*—35.8 parts of the diamino sulphone obtained, as in Example 4, by condensing the quinone di-imine from p-phenylenediamine with 1-sulphino-2-hydroxynaphthalene-3-carboxylic acid are made into neutral solution with soda ash in 300 parts of water. The monoacetyl derivative is obtained by stirring for some hours with 11 parts of acetic anhydride after adding 14 parts of sodium acetate. The product is made neutral to litmus by the addition of soda ash and 6.9 parts of sodium nitrite in 50 parts of water are then added. The whole is then stirred at 5–10° C. into 12.5 parts of hydrochloric acid in 100 parts of water. Into the stirring diazo suspension so obtained is slowly run a cooled solution of 13.7 parts of 4-methoxy-m-toluidine in 150 parts of water containing 10 parts of hydrochloric acid. Coupling is helped by the careful addition of soda ash until the reacting mixture is faintly alkaline and when complete, the intermediate mono azo dyestuff is rediazotized by adding 35 parts of hydrochloric acid (31.5 per cent) followed by 6.9 parts of sodium nitrite in 50 parts of water.

When rediazotization is complete, the product is slowly stirred at about 10° C. into a solution of 33.7 parts of the mono sodium salt of 2-phenylamino-5-naphthol-7-sulphonic acid in 300 parts of water together with sufficient soda ash to ensure a definite alkaline reaction at the end.

At the completion of the coupling, the new dyestuff is isolated by salting out at 70–75° C. On drying and grinding, it is a black powder. It dyes wool from an acid bath in reddish-violet shades of good fastness to soaping. After-chroming produces no change in shade. When printed on cotton with chrome mordant, violet shades of good fastness to soap and chlorine are obtained.

The corresponding p-diamino and p-hydroxy-aminosulphones derived from 3-sulphino-5-methyl-salicylic acid and from 3-sulphino-5-chloro-salicylic acid when used in the preparation of new azo dyestuffs are found to give very similar products to those obtained in the preceding example. These new colours also are applicable as acid colours and after-chrome colours for wool and as chrome printing colours for cotton.

What I claim and desire to secure by Letters Patent is:—

1. In the manufacture of new azo dye intermediates and new azo dyes therefrom, the process which comprises condensing a compound selected from a class consisting of 1-carboxy-2-hydroxy-3-sulphino benzene and naphthalene compounds with a second compound selected from a class consisting of benzene and naphthalene nitro compounds which contain a labile halogen atom and reducing at least one of the nitro groups to an amino group.

2. In the manufacture of new azo dye intermediates and new azo dyes therefrom the process which comprises condensing a 1-carboxy-2-hydroxy-3-sulphino benzene compound, which is substituted in the position para to the hydroxyl group with a second compound selected from a class consisting of benzene and naphthalene nitro compounds which contain a labile halogen atom and reducing at least one of the nitro groups to an amino group.

3. In the manufacture of new azo dye intermediates and new azo dyes therefrom the process which comprises diazotizing the product obtained by the process of claim 1 and coupling it with an azo dye coupling component.

4. In the manufacture of new azo dye intermediates and new azo dyes therefrom the process which comprises diazotizing the product obtained by the process of claim 2 and coupling it with an azo dye coupling component.

5. In the manufacture of new azo dye intermediates and new azo dyes therefrom the process which comprises diazotizing a compound of the type

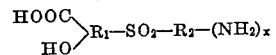

wherein $x$ represents 1 or 2, $R_1$ and $R_2$ represent benzene or naphthalene residues which may be further substituted and in which the $-SO_2-$ and the $-COOH$ groups are ortho to the $-OH$ group, and coupling with an azo dye coupling component.

6. In the manufacture of new azo dye intermediates and new azo dyes therefrom the process which comprises diazotizing a compound of the type

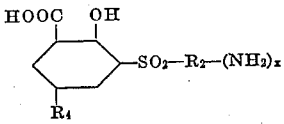

wherein $x$ represents 1 or 2, $R_2$ represents a benzene or a naphthalene residue which may be further substituted and $R_4$ represents a substituent group, and coupling with an azo dye coupling component.

7. As new azo dye intermediates and related azo dyestuffs, the compositions of matter represented by the following probable formula

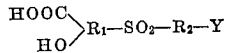

wherein $R_1$ and $R_2$ represent benzene or naphthalene residues which may be further substituted, Y represents a substituent selected from a group consisting of $-NH_2$, $-N:N-R_8$ and $-N:N-R_8-N:N-R_9$ wherein $R_8$ and $R_9$ are residues of azo dye components, and in which the $-SO_2-$ and the $-COOH$ groups are ortho to the $-OH$ group.

8. As new azo dye intermediates and related azo dyestuffs, the compositions of matter represented by the following probable formula

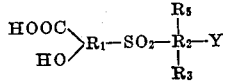

wherein $R_1$ represents a benzene or naphthalene residue which may be further substituted, $R_2$ represents a benzene residue, $R_3$ represents $-H$, $-SO_3H$, $-NH_2$, $-CHO$, $-CN$, $-COOH$, $-NO_2$ or an acetylated amino group, $R_5$ represents a hydrogen or an amino group, Y represents a substituent selected from a group consisting of $-NH_2$, $-N=N-R_8$ and $-N=NR_8-N=N-R_9$ wherein $R_8$ and $R_9$ are residues of azo dye components, and in which the $-SO_2-$ and the $-COOH$ groups are attached to $R_1$ in the ortho positions in respect to the $-OH$ group.

9. As new azo dye intermediates and related azo dyestuffs, the compositions of matter represented by the following probable formula

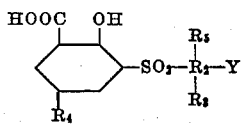

wherein $R_2$ represents a benzene residue, $R_3$ represents $-H$, $-SO_3H$, $-NH_2$, $-CHO$, $-CN$, $-COOH$, $-NO_2$ or an acetylated amino group, $R_4$ represents a substituent group, $R_5$ represents $-H$ or $-NH_2$ and Y represents a substituent selected from a group consisting of $-NH_2$, $-N=N-R_8$ and $-N=N-R_8-N=N-R_9$ wherein $R_8$ and $R_9$ are residues of azo dye components.

10. As new azo dye intermediates and related azo dyestuffs, the compositions of matter represented by the following probable formula

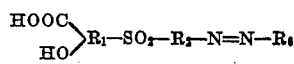

wherein $R_1$ and $R_2$ represent benzene or naphthalene residues which may be further substituted, $R_6$ represents a coupled azo dye component and in which the $-SO_2-$ and the $-COOH$ groups are attached to $R_1$ in the ortho positions in respect to the $-OH$ group.

11. As new azo dye intermediates and related azo dyestuffs, the compositions of matter represented by the following probable formula

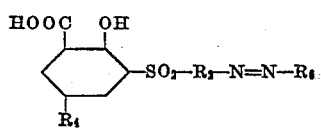

wherein $R_2$ represents an aromatic residue which may be further substituted, $R_4$ represents a substituent group and $R_6$ represents a coupled azo dye component.

12. As new azo dye intermediates and related azo dyestuffs, the compositions of matter represented by the following probable formula

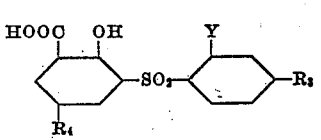

wherein $R_3$ and $R_4$ represent substituent groups and Y represents a substituent selected from a group consisting of $-NH_2$, $-N=N-R_8$ and $-N=N-R_8-N=N-R_9$ wherein $R_8$ and $R_9$ are residues of azo dye components.

13. As new azo dye intermediates and related azo dyestuffs, the compositions of matter represented by the following probable formula

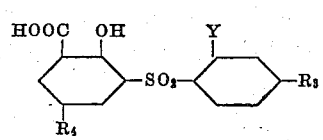

wherein $R_4$ represents $-Cl$ or $-CH_3$, $R_3$ represents $-SO_3H$, $-CHO$, $-NH_2$, $-CN$, $-COOH$, $-NO_2$ or an acetylated amino group and Y represents a substituent selected from a group consisting of $-NH_2$, $-N=N-R_8$ and $-N=N-R_8-N=N-R_9$ wherein $R_8$ and $R_9$ are residues of azo dye components.

14. As a new azo dyestuff, the composition of matter represented by the following probable formula

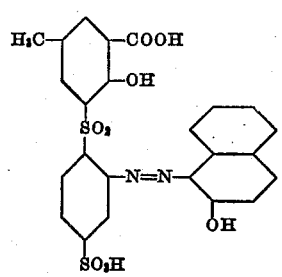

15. As new azo dyestuffs, the compositions of matter represented by the following probable formula

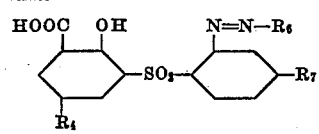

wherein $R_4$ and $R_7$ represent substituent groups and $R_6$ represents a coupled residue of an azo dye component.

In testimony whereof I affix my signature.
MORDECAI MENDOZA.

Certificate of Correction

Patent No. 1,766,949.                                              Granted June 24, 1930, to

MORDECAI MENDOZA

It is hereby certified that error appears in the printed specification of the above numbered patent requiring correction as follows: Page 1, line 25, for "$(NA_2)$" read $(NH_2)$; page 2, lines 67 and 68, for "substitution" read *substituent;* page 9, line 8, claim 8, for "$-N=N-R_8$ and $-N=NR_*-N=N-R_9$" read *$-N=N-R_8$ and $-N=N-R_8-N=N-R_9$;* and that the said Letters Patent should be read with these corrections therein that the same may conform to the record of the case in the Patent Office.

Signed and sealed this 22d day of July, A. D. 1930.

[Seal.]                                                                   WM. A. KINÑAN,
*Acting Commissioner of Patents.*